United States Patent [19]
Powell

[11] Patent Number: 6,079,692
[45] Date of Patent: Jun. 27, 2000

[54] COMBINATION DIAPHRAGM AND GROOVE COUPLER SEAL FOR AUTOMATIC CONTROL VALVES

[75] Inventor: Douglas H. Powell, El Macero, Calif.

[73] Assignee: Hunter Innovations, Sacramento, Calif.

[21] Appl. No.: 08/826,653

[22] Filed: Apr. 3, 1997

[51] Int. Cl.[7] .................................................. F16K 31/126
[52] U.S. Cl. ........................................ 251/61.1; 251/331
[58] Field of Search ................... 251/61.1, 331, 251/368

[56] References Cited

U.S. PATENT DOCUMENTS

| | | | |
|---|---|---|---|
| 3,502,297 | 3/1970 | Wardrup | 251/61.1 |
| 4,109,624 | 8/1978 | Washio et al. | 251/61.1 |
| 4,720,079 | 1/1988 | Iizuka et al. | 251/61.1 |

FOREIGN PATENT DOCUMENTS

| | | | |
|---|---|---|---|
| 2042327 | 3/1971 | Germany | 251/61.1 |
| 2402669 | 8/1974 | Germany | 251/61.1 |

*Primary Examiner*—A. Michael Chambers
*Attorney, Agent, or Firm*—Mark C. Jacobs, Esq.

[57] ABSTRACT

A combination diaphragm and seal device for valves which replaces a conventional bolt down diaphragm, and which permits automatic control valves and other valves to be closured by an industry standard groove coupler rather than a plurality of bolts through an external flange on the valve body. The diaphragm portion has a flat circular section with a central bore. This portion may be reinforced by a fabric layer and may or may not include a convolute for extra flexibility. The diaphragm portion is overlaid within and across the interior diameter of the groove coupler seal portion at about the midpoint thereof.

13 Claims, 6 Drawing Sheets

COMBINATION DIAPHRAGM AND GROOVE COUPLER SEAL FOR AUTOMATIC CONTROL VALVES

FIELD OF THE INVENTION

This invention relates to diaphragms and seals for controlling the flow of water through valves used primarily in water distribution pipeline systems.

BACKGROUND OF THE INVENTION

It is known in the water distribution industry that diaphragms are used in Automatic Control Valves, a standard piece of hardware of the industry, for two purposes: First, diaphragms, being made of a rubber-like material form a flexible barrier between two chambers of the valve in order to hydraulically actuate a closing plate to move against an orifice. Second, the diaphragm is used to seal a removable cover to the main body of the valve such that the inside of the valve may be serviced without the necessity of removing the main body from the pipeline. For to do so, requires a large expenditure of both time and labor.

Diaphragms, in use today, serve as a sealing mechanism, but they rely on some type of external fixation means to apply the sealing force. The most common mechanism for applying such pressure is a series of uniformly spaced bolts disposed around the periphery of the diaphragm and fastened to a pair of flanges, one on each side of the diaphragm. Each of said bolts has a predefined finite tensile strength and thus, through relatively easy math, the force being applied can be determined.

One of the problems associated with such fixation means is that as the pressure exerted against the cover of the Automatic Control Valve, (ACV) the amount of predetermined tensile strength remaining decreases. Thus as the water pressure increases, the less the sealing potential, often leading to leaks and failure of the seal.

Figure 1:
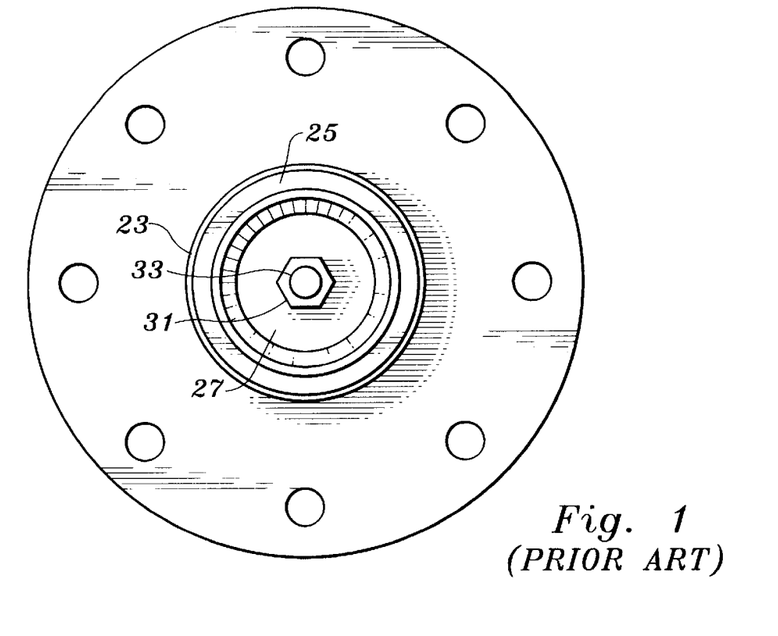
FIG. 1 is a top plan view of a prior art seal and diaphragm for a standard prior art water system automatic control valve, wherein the diaphragm has a plurality of bolt holes around the periphery.

An industry standard diaphragm having a plurality of uniformly disposed bores therethrough around the periphery of the diaphragm for the reception of such previously described bolts is shown in FIG. 1 and labeled prior art.

A groove coupler is an industry standard sealing device which can be used in conjunction with a chamfered rubber gasket to form a seal which increases, not decreases, in sealing potential as the water pressure increases. A groove coupler operates in a fashion similar to a waffle iron in that a closure mechanism keeps two halves of the coupler closed tight under presser, and when the closure is released, the pressure is removed and the two halves, often pivotally connected opposite the closure can be opened. Such couplers are shown in at least one of the figures, and are offered by several manufacturers.

Whereas current diaphragms rely primarily on the use of the externally disposed ring of bolts to maintain sealing strength, the device of this invention relies on its unique configuration, in conjunction with the operation of the groove coupler to maintain sealing strength.

It is an object therefore of this invention to provide a combination groove coupler seal & diaphragm.

It is another object to provide a new sealing device that operates with an industry standard groove coupler.

It is still another object to provide a sealing diaphragm which permits lower cost field service of valves due to the reduction of the number of bolts to be undone and retightened by the field personnel, It is yet another object to provide a valve sealing mechanism that is lower in cost of production.

It is a further object to provide a combination seal and diaphragm that is easy to use and takes less time to install than conventional diaphragms.

It is still another object to provide a combination seal & diaphragm that may be fabric reinforced or without such fabric, and also to provide such diaphragm seals either with or without a convolute for extra flexing capacity.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A combination diaphragm and seal device that replaces a conventional bolt down diaphragm, and which permits automatic control valves to be fastened by an industry standard groove coupler rather than a plurality of bolts through a conventional diaphragm. The development permits valves to be fabricated to order and to conditions, from tubing rather than having to be precast. The diaphragm portion may be reinforced by a fabric layer and may or may not include a circular convolute spaced in from the edge thereof for extra flexibility. The diaphragm portion is overlaid within and across the interior diameter of the groove coupler seal portion.

DESCRIPTION OF THE PREFERRED EMBODIMENT

It is known to the art that in a fluid valve system, that incorporates a diaphragm, that as pressure acts on the diaphragm, an orifice is either opened or closed. It is either the diaphragm that acts as the closure means, or a shut off plate that is attached to a rod which rod passes through the center of the diaphragm, whereby the plate moves into and out of the orifice to control fluid flow. The movement of the diaphragm is caused by the pressure differential on both sides of the diaphragm. But what holds the diaphragm in place so it does not float around? Answer, the diaphragm extends out beyond the orifice of the valve and the diaphragm contains a plurality of bores around the periphery of the diaphragm filled by bolts that secure the diaphragm in position. See FIG. 1 for example. This plurality of bolts as positioned is called an external fixation means. That is, the fixation is external to the flow of water or other liquid within the valve. See FIG. 2. So it is seen that the diaphragm serves two purposes, first to control the flow within the valve, and second to keep the fluid from leaking out of the valve.

In the invention of this application, the diaphragm is used for the same first purpose, i.e., to form a flexible barrier between two chambers to hydraulically actuate the shut off plate to control fluid flow. But instead of having the external fixation means as previously discussed, I utilize a piece of hardware previously used for a different purpose. That hardware item is an industry standard groove coupler, which is normally only used to hold two pieces of mating metal such as piping together with a standard groove coupler seal retained by the coupler to prevent leakage.

Figure 6:
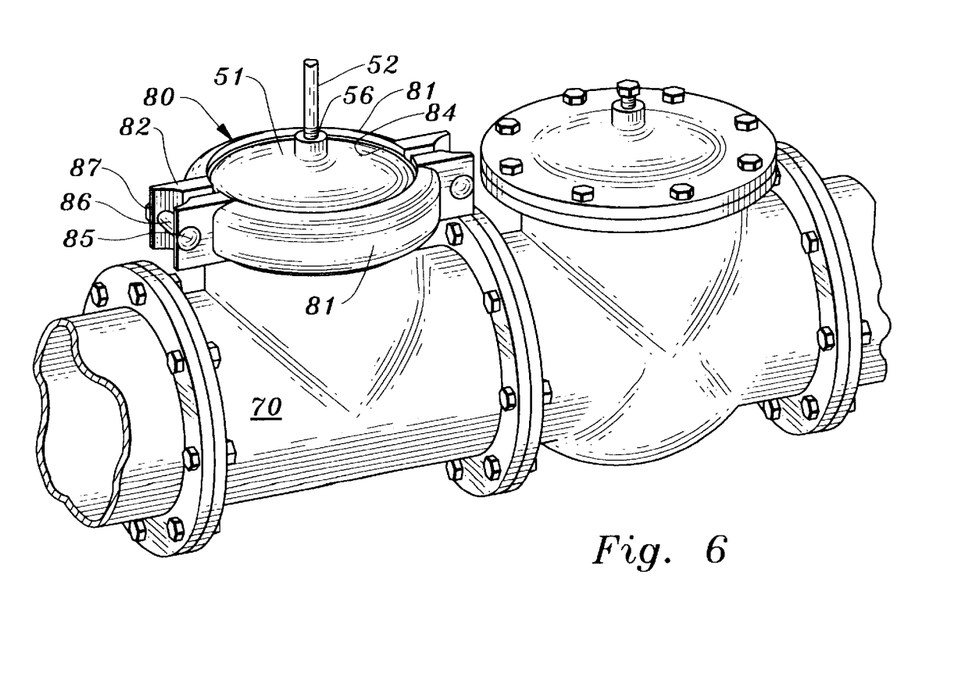
FIG. 6 is a top perspective view showing the device of this invention mounted for use with a coupler (groove coupler) overlaid in position.

This groove coupler, seen for example as element 80 in FIG. 6, is to be employed by me for three purposes. First it will act to fix the locus of the diaphragm internal to the valve such that the diaphragm can act in its normal fashion. Second it will be used to seal the valve by retaining a groove coupler seal to prevent internal fluid leakage, and third to hold the lid on the valve, i.e., to hold one piece in a mating relationship with another. The benefits of my structure, as will be discussed below, that permit the use of the groove coupler will be set forth infra.

Reference is now made to FIG. 1, which depicts a typical conventional circular diaphragm which as can be seen has certain hardware mounting items associated therewith to permit its use. These hardware items include the metal annular member 23, known as a shut off disk cup; the rubber annular member 25, the shut off disk, and the pie pan shaped central member 27, called a shut off disk retainer. All of these are held in place by a threaded bolt 33 overlaid by nut 31. All of these hardware items are deemed conventional as is their functionality and as such no further discussion is deemed necessary.

Figure 2:
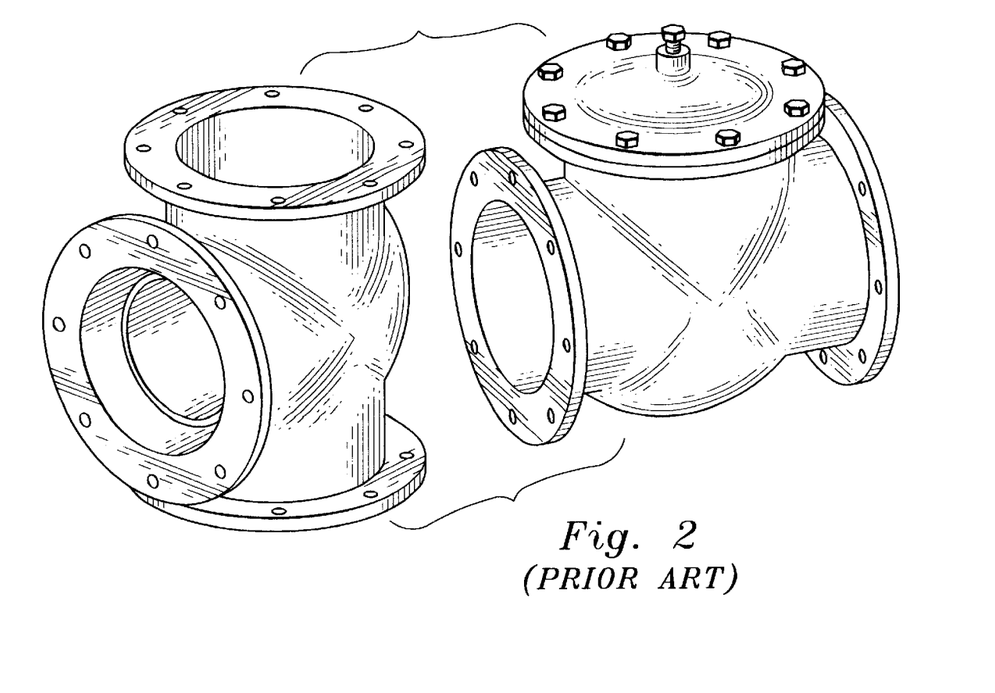
FIG. 2 is a perspective view of two conventional Automatic Control Valves, the one on the left lacking a valve cover and thus showing the surface for placement of the conventional diaphragm's bolts; and, the one on the right showing the valve cover bolted in place.

FIG. 2 depicts two conventional prior art valves. The valve on the left is shown without a valve cover on the end, and can be seen to have an inner area for the flow of fluid and a flat plate area with a plurality of bolt holes which are adapted to align with the bores in the diaphragm of FIG. 1 prior to the placement of a valve cover there over. The valve on the right, depicts a similar conventional valve but with a suitable conventional valve cover disposed over the opening. Note the bolts used to hold the cover to the valve body.

Figures 3, 4:
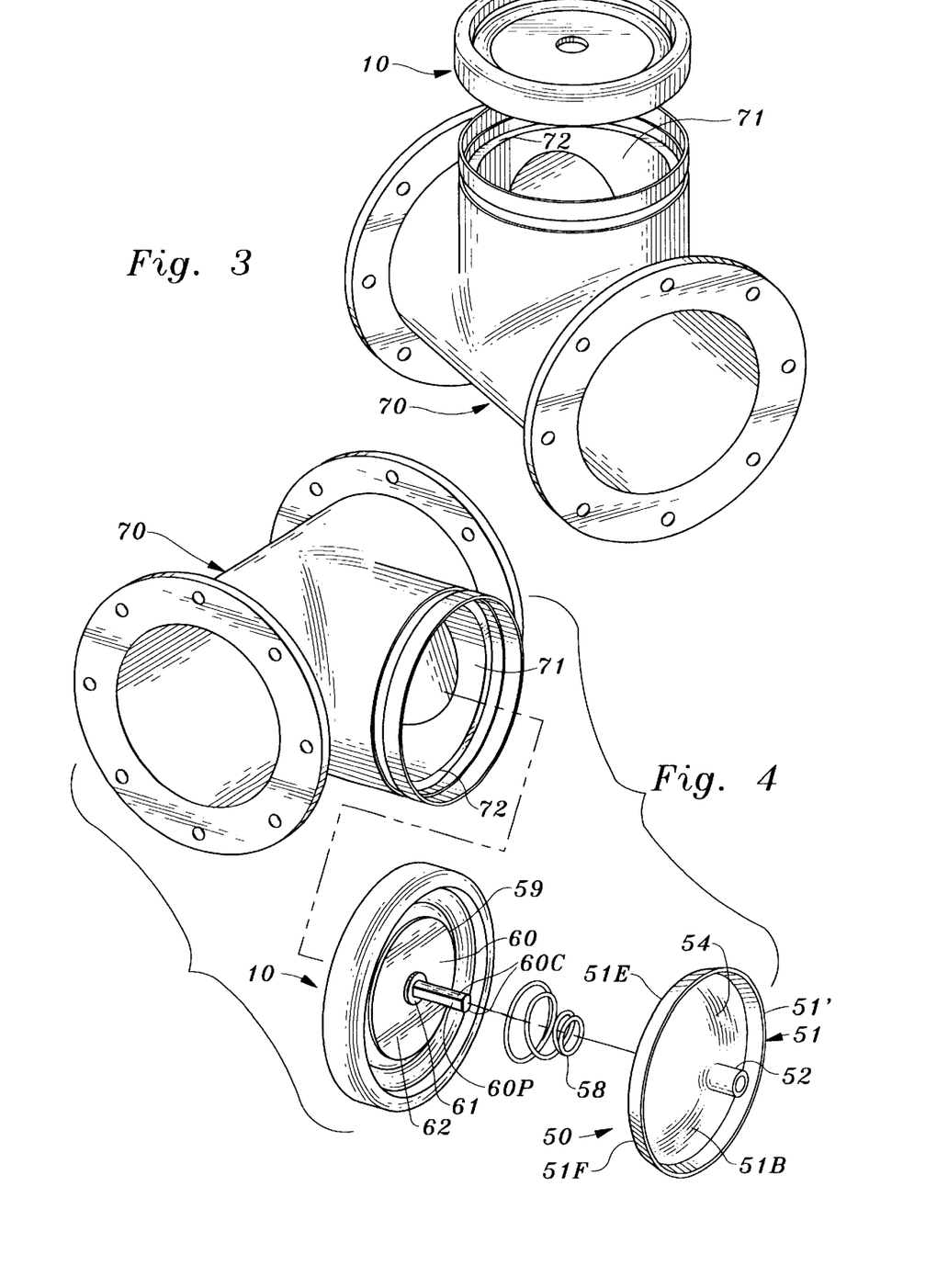
FIG. 3 is a perspective view of a modern water automatic control valve adapted to the use of the combination diaphragm & seal of this invention and showing the inventive combination diaphragm and seal of this application in a spaced-away position.
FIG. 4 is an exploded view of a valve suitable for use with this invention and showing the combination diaphragm & seal and the various mounting components that are utilized therewith.

In FIG. 3, a valve body 70 according to this invention capable of employing the inventive combination diaphragm & seal 10 is seen. The valve body 70 includes an opening 71 adapted peripherally to receive a coupler, 80 seen in FIG. 6, and it has a grooved seat 72. All other aspects of the valve body are inconsequential to this discussion. Shown spaced from the seat 72, but sized to fit the seat is the device 10 of this invention.

Figure 9:
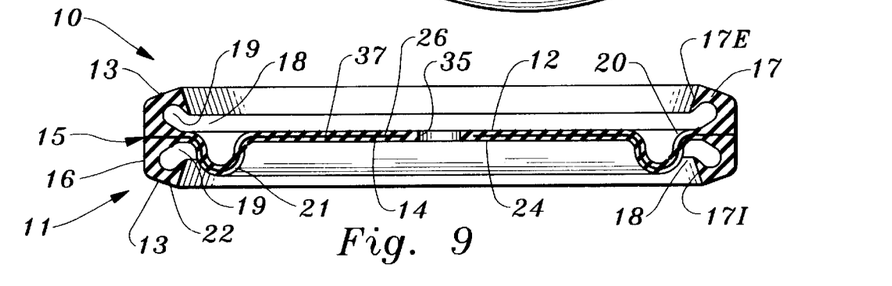
FIG. 9 is a sectional view of the first embodiment of the combination diaphragm and seal of this invention.
Figure 10:
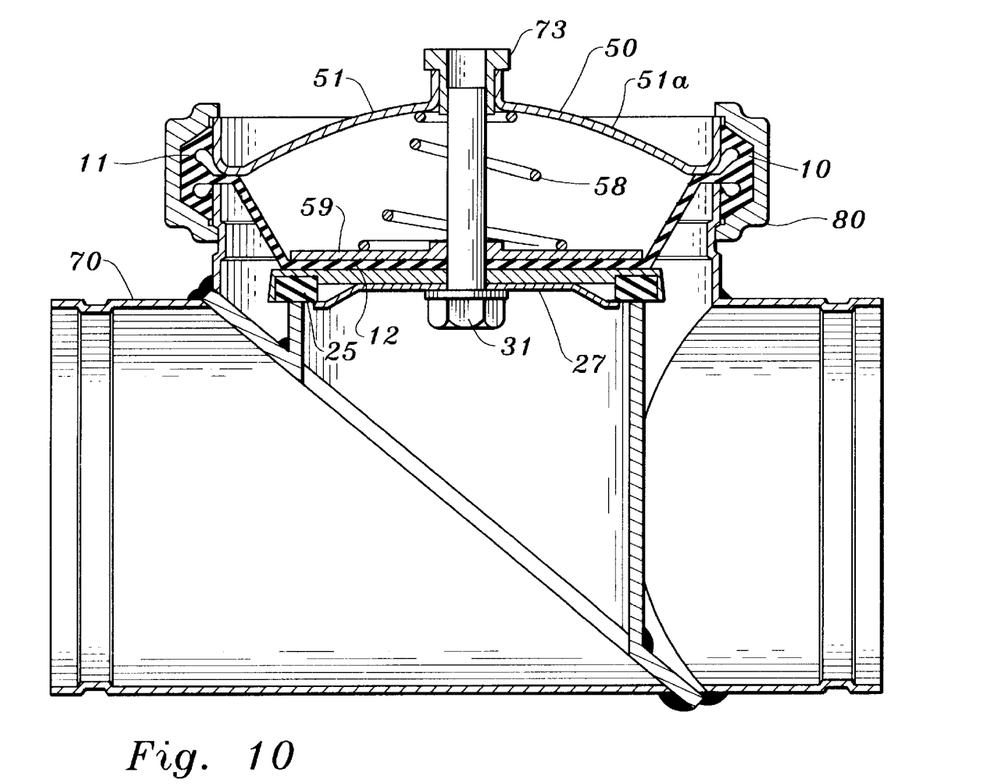
FIG. 10 is a diagrammatic vertical section of a water flow valve with the device of this invention in position and with a coupler to retain same.

Reference should now be made to FIG. 9 which depicts the device of this invention in cross section. Device 10 is called a combination diaphragm & seal because it incorporates aspects of both. The device of this invention includes a central diaphragm section, which may or may not be reinforced with an intermediate fabric layer, and the device 10 may or may not include a convolute in the diaphragm portion to enhance flexibility. The flat diaphragm section also includes a central opening 35 for an actuator rod. The seal portion is an annular member with the diaphragm portion disposed within and across the interior diameter of the annular member at about the midpoint in elevation.

Figure 14:
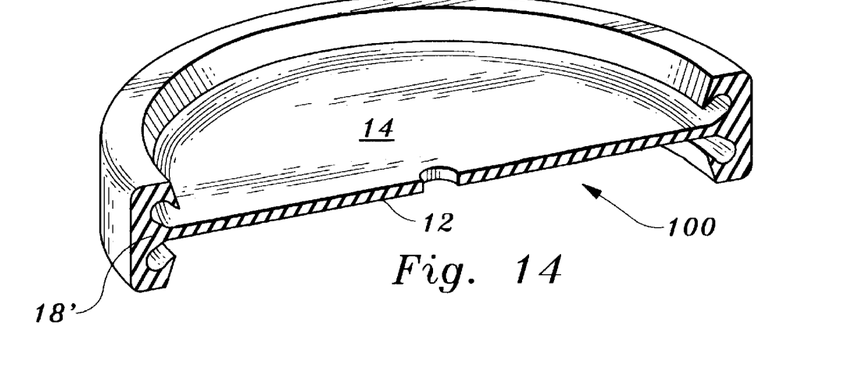
FIG. 14 is a view similar to FIG. 9, of a second embodiment of this device, but excluding a convolute.

Thus device 10 includes a diaphragm portion 12 and a groove coupler seal portion 11 annexed thereto. The diaphragm portion 12 has a circular flat central section 14 of a finite diameter, with a central bore 35 therein. Preferably a convolute section 21 is disposed in parallel alignment in a circumscribing manner around the outer periphery of central section 21. The optional convolute permits the diaphragm portion to flex to a greater extent than would be possible if the convolute were not present. If present the convolute 21 is connected to the interior midpoint, 20 of the seal portion. Reference is made to the brief discussion of FIG. 14 infra, which excludes the convolute but which has its diaphragm portion connected to the same location on the seal portion. Convolutes are well known in the sealing art and further discussion is not justified.

Preferably a fabric interlayer 24 as shown, is present inside the central section 14 and the convolute 21 to add strength to the diaphragm portion. Such fabric when present is present in both the flat central section and the convolute.

The seal or gasket portion 11 of the device 10 includes a trio of sections; a generally elongated vertically outer section 16, of a finite elevation, a pair of opposed inwardly directed boot shaped sections 22 and a generally triangular middle section 18, all of which are integrally formed together.

Section 16 is defined by a generally vertical outer surface 15, from which emanates, one at each end, a pair of opposed angular inwardly directed top and bottom walls 13. This angle of inclination is generally about 20 degrees. An imaginary line 26 forms the interior boundary of the outer section to give it a parallelogram configuration.

A pair of opposed boot shaped sections 22 are directed from the imaginary line 26 inwardly from each extreme of the outer section 16, with their tips facing each other. The top wall of each of these sections is a linear continuation of the wall 13 forming the top and bottom walls respectively of the outer section, 16. The sole of the "boot" is a wall 17 normal to the continuation of wall 13, and directed inwardly toward the diaphragm portion. The interior one of these "boots" is designated 17-I while the exterior facing one is designated 17-E. That nomenclature, interior/exterior is based on the position of the device when placed for use.

A generally triangular middle section 18, with its apex connected to the outer section at about the midpoint in the elevation thereof, is inwardly directed from about the midpoint of the of the outer section 16 a distance substantially equal to the inward extension of each of the boot sections 22, i.e., wall 17. One of a pair of opposed bent channels 19, each with an arcuate terminal area, separates each of the top and bottom sections respectively from the middle section 18. These channels 19 extend inwardly to the imaginary line 26 forming the inner wall of the outer section. It is due to these channels that this item is commonly designated as a groove coupler seal.

The preferably present fabric interlayer 24 extends through the center section of the diaphragm portion of the device, through the triangle section 18 of the seal and outer section 16 of the seal as well. This is achieved by placing the fabric layer 24 within the mold prior to the insertion of the rubber into the mold. Such a technique is deemed conventional.

It is seen that I have just described an integrated structure that consists of a diaphragm portion 12, connected to a groove coupler seal portion 11.

In order to utilize the combination diaphragm and seal just described, a plurality of hardware components are necessary. Thus reference is made to FIG. 4 which is an exploded view of many of the components needed for the control of an automatic control valve.

At the far right is the control valve cover with integrated bearing and shaft 50. This unit 50 serves as a pressure plate in that the dished plate 51 having a front face 51F which is concave and a back face 51B. Plate 51's outer edge 51E nests into the seal portion 11 against exterior wall 17-E. Cover 50, as noted, includes a dished or concave plate 51 having a rearwardly directed flange 51E and an interiorly threaded shaft 52. The threads are adapted to engage a portion of a pressure gauge or other instrument not seen. The flange 51F is the part of the valve cover 50 which rests abuttingly against wall 17-E. Due to the perspective of this view, reference will also be made to FIG. 11 which shows the interior face of cover 50.

Figure 11:
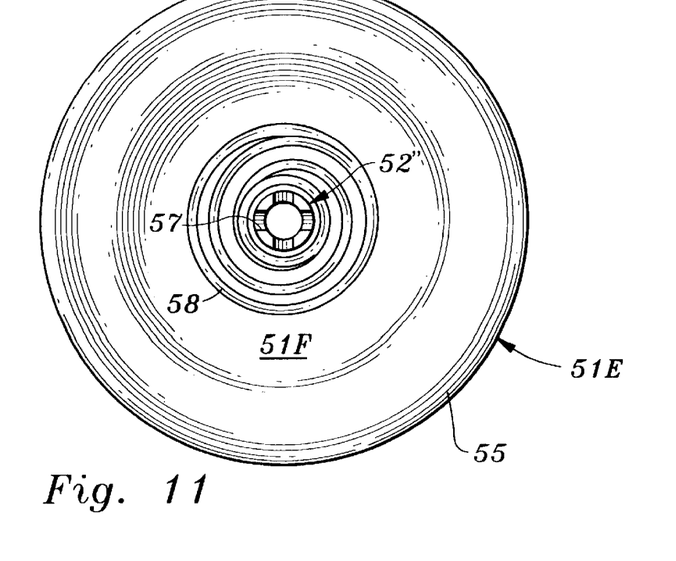
FIG. 11 is an interior plan view of a component utilized with the device of this invention in the assembly of a valve.

The reader is now asked to turn to FIG. 11. Here it is seen that the shaft 52 extends slightly beyond the face of the dished plate 51, said extension being designated 52'. This shaft 52 is centrally bored and part way interiorly threaded near the end distal from the plate 51 includes four (4) notches 57 which create a path of communication from the dished plate 51's front surface 51F through the shaft 52 for the relief of pressure.

A coil spring 58 whose smallest coil is slightly greater in diameter than the diameter of the shaft 52 is disposed around the extension of the shaft 52, designated 52". See also FIG. 11.

Returning to FIG. 4, the next element is an integrated bearing plate, 59 having a disk or plate 60 to which is attached on one side a central washer like element welded to or formed with an off round shaft 60. This shaft 60 seen also in FIG. 8 has two curved edges 60C and two parallel edges 60P. The off round shaft 60 is disposed through the central bore of shaft 52.

Figure 7:
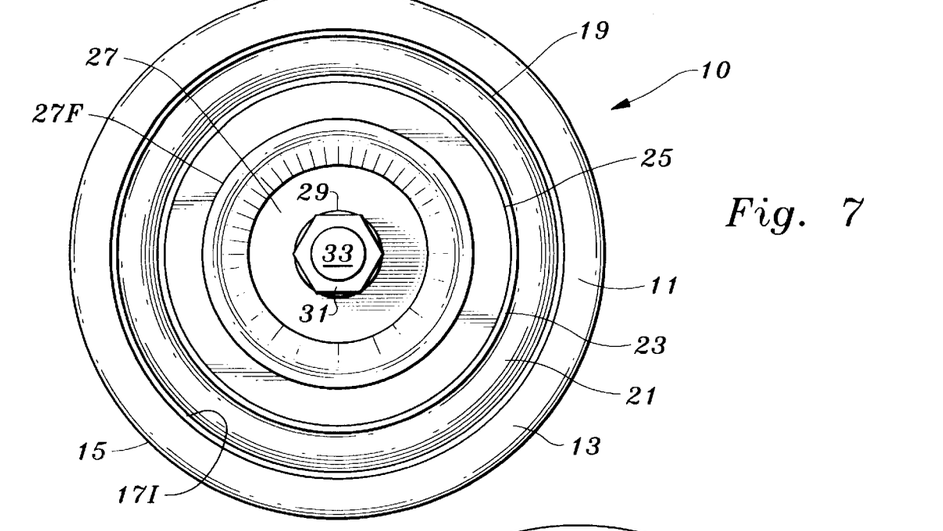
FIG. 7 is a plan view of the interior surface of the combination diaphragm and seal of this invention and the mounting hardware utilized therewith.
Figure 8:
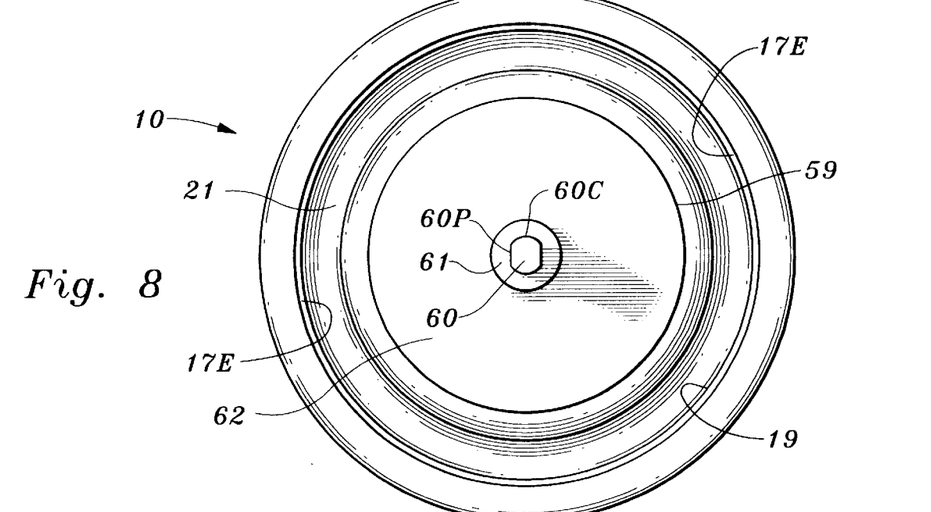
FIG. 8 is an exterior plan view of the same device with the hardware utilizable therewith.

In FIG. 8, which depicts the reverse side of the device 10 from that shown in FIG. 7. Note, however, that the convolute 21 is seen from the underside, more correctly the exterior facing side. The bearing 61 used to stabilize the shaft relative to the plate 62 is also seen, as is shaft 60. This off round shaft has two curved edges 60C and two parallel shaved edges 60P. The gap presented by the employment of the shaved edges permits pressure built up between dished plate 51 and plate 62, to dissipate through the notches 52' and the gap formed between the shaved edges 60P and the interior of the shaft 52.

Plate 62 has a diameter such that it can rest spaced from the central section of the diaphragm upon the flat central circle 14 of the diaphragm portion 14 inward of the rise of the convolute. When no convolute is present in the diaphragm portion, the positioning is the same and the same mounting components are employed.

It is noted that if no convolute is present, then to permit adequate flex of the central flat section 14, a smaller diameter integrated bearing plate would be necessitated. This plate is seen connected to the device 10 in FIG. 4.

The next element is the valve body itself, 70. Note the conspicuous absence of a bored externally directed flange plate.

Figure 5:
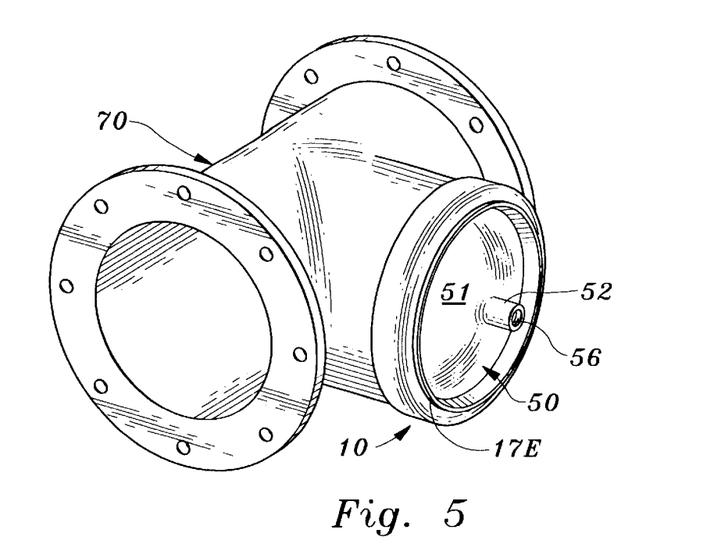
FIG. 5 is a side perspective view showing the combination diaphragm & seal and the components necessary to utilize same, in position in a flow control valve, but absent the coupler necessary to retain the combination diaphragm and seal.

When the components of FIG. 4 are assembled, the appearance is that of FIG. 5. Note how plate 51 rests within the device 10 against the wall 17E as spelled out supra. A valve cover of the conventional nature formed as a casting is not seen as it is not needed. A standard groove coupler, also not seen would complete the valve assembly.

Thus reference is made to FIG. 6, wherein valve body 70 is seen to have two conventional ends for connection within the pipe system, and also has a vertical central section adapted for this invention. Dished plate 51 is seen surrounded on its peripheral edge by a conventional groove or coupler 80. Coupler 80 as is known includes a pair of jaws 81 each of which has an outwardly directed flange 82, each with a bore 84 therein. A bolt 86 passes through the two flanges 82 and is retained by a nut 87, in the same manner any conventional groove coupler seal would be retained in such a coupler.

The reader's attention is turned to FIG. 7. The devices of this invention utilizes several hardware components to be operable within a valve body. Some of these may be seen in FIG. 4, the exploded view, others are visible only here in FIG. 7. FIG. 7 illustrates a plan view of the interior side of a combined diaphragm and seal assembly. The term assembly includes the device of this invention with associated hardware.

In this figure, one notes several members, many of which are seen as well as being associated with the prior art diaphragm of FIG. 1. Since like parts bear like numbers, these conventional items are similarly numbered as in FIG. 1. Thus as seen looking out from the center and moving toward the periphery, one sees first the threaded shaft 33, which carries a lock washer 29, and a hex nut 31. The nut is threaded down such that the washer 29 abuts a pie pan shaped member 27 designated as a shut off disk retainer. Again this is a state of the art component. See FIG. 1.

Adjacent to as well as underlying the outwardly extending upper peripheral flange 27F of the disk retainer 27 is a rubber annulus 25 called a shut off disk. Disposed in an abutting relationship to this annulus 25 is a metal ring, usually of steel called a shut off disk cup, 23. This disk cup 25 abuts rubber annulus 25 on its interior side and the convolute 21 of the inventive device, if present. Disk cup 25 as seen here is of a slightly higher elevation than the convolute 21. The disk retainer 27, and the annuli 25 and 23 are all conventional hardware parts know to the valve art, and used in a conventional manner but on the inventive device of this application.

In FIG. 8, partially discussed elsewhere herein, the exterior facing side of device 10 is seen in plan view, along with the interior side of another component of a valve assembly. This same component 59, is seen in rear perspective in FIG. 4 abutting device 10.

FIG. 11 is a diagrammatic sectional view of an assembled valve assembly according to this invention. Thus device 10 with a diaphragm portion 12 and a groove coupler seal portion 11 is shown disposed within the Victaulic™ coupler 80. The spring 58 is shown in position against the integrated bearing plate. Note also the exact disposition of the pressure plate 59 against the circular central section 12 of diaphragm 14. The pressure member 50's dished plate 51 is also seen. Bearing 73 is disposed in the opening of cover plate 50. Since all of these elements have been previously discussed no separate text is deemed necessary. This drawing is seen therefore to have been included merely to clarify the relative positions of various components when assembled.

Figure 12:
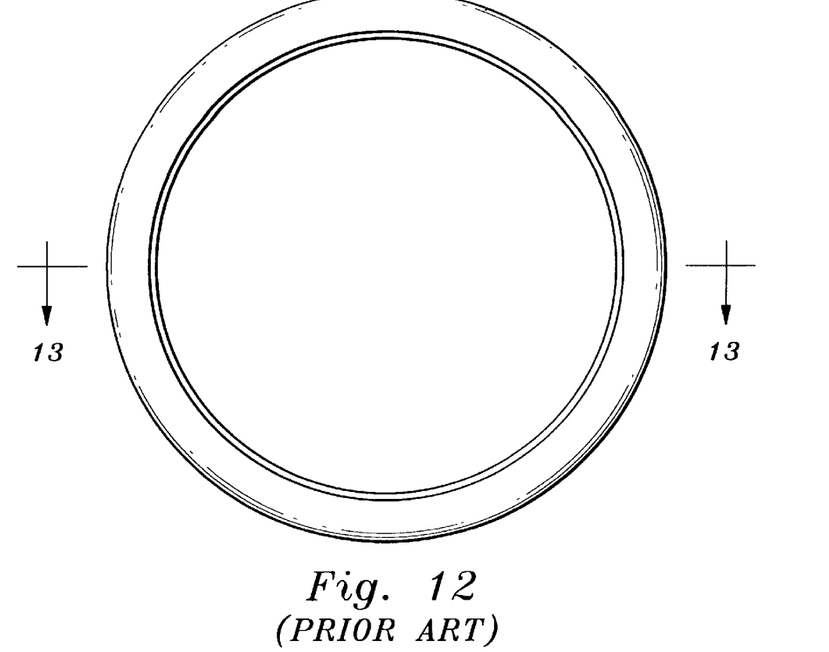
FIG. 12 is a top plan view of a prior art groove coupler seal.
Figure 13:
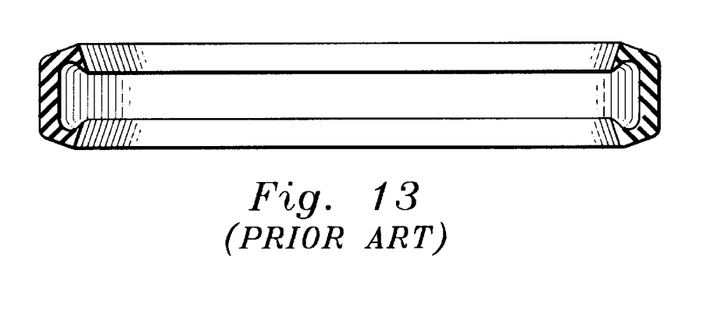
FIG. 13 is a cross-sectional view thereof.

FIGS. 12 and 13 represent top plan and sectional views of a conventional groove coupler seal, i.e., an annular member with arcuate recesses therein. Since the exact configuration of the internal surface has already been discussed, with respect to this invention, the description of this prior art unit need not be amplified.

Previously I have indicated that the device of this invention may be made either with or without a central fabric layer and with or without the convolute. One half of a non-fabric containing unit is shown in perspective in FIG. 14 and designated 100. Note how the diaphragm portion 12 is comprised solely of the central flat circular section 14, and which is attached to the triangle section 18' of the seal portion. Since 18' is the same as element 18 additional discussion of this section is not mandated.

ADVANTAGES

The advantages of the device of this invention are many in number. The obvious benefit is that no flange is needed, and as such there is a significant material saving in that diaphragms of a smaller diameter more closely approximating the size of the valve can be utilized. Consequently, physically smaller valve bodies can be employed for the same throughput.

Another big advantage is that the devices of this invention- called devices plural, because they can be made in various diameters, 6, 7, 8, 10, 12" et cetera, seal through a full range of pressures. One need not increase the size of any mechanical portion of the valve system to make it seal tight. With these devices, the greater the pressure thereupon, the better the seal.

By doing away with the flange portion of the diaphragm, the need for the two flange plates which had the plurality of apertures (bolt holes) therein is obviated.

A corollary to this benefit is the fact that valves can now be fashioned out of welded tubes at a significantly cheaper price than when castings are utilized to make the valve body. Control valves can now be custom manufactured to suit the customer's situation. Mix and match type valves can be made to fit spaces, angles et cetera. Thus valves can be made by "at the site" welding techniques, rather than having to wait long periods of time to either procure off-the-shelf castings or to have specialty castings made.

As to fabrication costs, it is estimated that by using the combination diaphragm and seal of this invention that the cost of fabricating a valve system can be cut between 40 and 60 percent depending upon the diameter of the valve.

By combining the use of a groove coupler with a diaphragm, the need for retaining bolts—the exact number of which is determined by a known formula, a discussion of which is beyond the scope of the patent application,—is totally eliminated.

Plus, whereas the bolts have a predefined finite tensile stress point, which limits the pressure that can be applied within the valve, or run the risk of shearing the diaphragm retaining bolts. As greater pressure is applied to a prior art bolt on diaphragm, the sealing potential (the amount of tensile strength remaining) decreases. The higher the pressure, the less the sealing potential.

Whereas, with the structure of this application, the higher the pressure the tighter the seal with no worries about stressing these non-existent bolts. The sealing potential with this invention INCREASES as the liquid pressure increases. It is the unique configuration of the combination diaphragm and seal of this invention that works with a groove coupler to maintain sealing strength. This is a significant invention, as groove couplers are not known to have been utilized with automatic control valve before.

An easily appreciated benefit comes about in the servicing of the valve. It is much easier and faster to undo the one or sometimes two bolts as found in the groove couplers—one only as seen in the coupler of FIG. 6, than to have to undo a large number of bolts e.g. 24 for a 12" diameter valve standard diaphragm of the prior art.

Thus the use of groove couplers has now been extended from just coupling two pieces of pipe together, to a totally new arena; namely, to serve as closure means for valves. It is believed that this is the first time a groove coupler has been able to be used as the sealing mechanism for a automatic control valve. And, that is due to the nature of this invention which combines a diaphragm and seal into one article. Thus whereas valves were formerly made as castings, now valves can be fabricated from pipe sections, by adding the groove to each side for connection by the groove coupler. It is only due to the device of this invention which combines the features of a diaphragm with a rubber gasket seal that permits the groove coupler to be used as an external fixater for a automatic control valve cover.

UTILITY

It is believed that the devices of this invention will find use in fire line systems, since Victaulic™ couplings are currently in use in this industry. Irrigation and other water delivery system vendors would find use for these devices, since such markets are price driven. It is also believed that if made with proper materials, that these devices would find favor in the petroleum industry, which utilizes high pressure valves—something readily achievable with these devices.

If the devices of this invention are made without the convolute, either with or without fabric interlayer, the applications are limited to those with a minimal pressure differential. For example 300 pounds pressure on the top side and 294 on the bottom side.

MATERIALS

I prefer to use Buna rubber over a central fabric member for my combination diaphragm & seal. The fabric which may be omitted lends strength of the structure. Mention may be made of silk, polyester, cotton and nylon as suitable fabric materials. Other rubbers currently used for the prior art seals can also be utilized either with or without the fabric interlayer for making the devices of this invention.

Since certain changes may be made in the above device without departing from the scope of the invention herein involved, it is intended that all matter contained in the above description, shall be interpreted as illustrative and not in a limiting sense.

I claim:

1. A combination groove coupler seal and diaphragm, comprising:

(a) a groove coupler seal portion being an annular member having an outer section of a finite elevation connected to three inwardly directed sections, two of which are opposed boot-shaped sections at the top and bottom of said outer section, and a middle section spaced from each of said boot-shaped sections, with a channel having an arcuate terminal area separating said middle section from each of said boot-shaped sections; and (b) a flexible diaphragm disposed across the interior diameter of said seal portion's annular member, said diaphragm being attached to said middle section.

2. The combination seal and diaphragm of claim 1 wherein the diaphragm includes a circular convolute spaced in from the edge thereof.

3. The combination seal and diaphragm of claim 1 wherein the diaphragm includes a fabric reinforcement interlayer therein.

4. The combination seal and diaphragm of claim 2 wherein the diaphragm portion thereof includes a fabric reinforcement interlayer therein.

5. In the combination seal and diaphragm of claim 1 wherein the outer section of the seal has inwardly diverging top and bottom walls.

6. In the combination of claim 1 wherein the diaphragm has a central bore therethrough.

7. In the combination seal and diaphragm of claim 1 wherein the outer section of the seal has inwardly diverging top and bottom walls.

8. In the combination grooves coupler seal and diaphragm of claim 1 herein the middle section spaced from the boot-shaped sections is of a triangular configuration.

9. In the combination of claim 8 wherein an angled channel having an arcuate terminal area separates the triangular middle section from each boot section.

10. In a valve which includes a valve body having an inlet and an outlet, and an internal seat, a cap and a diaphragm and a seal, said valve adapted to be reused by the application of a coupling, the improvement comprising a combination groove coupler seal and diaphragm, said groove coupler seal being an annular member having an outer section of a finite elevation connected to three inwardly directed sections, two of which are opposed boot-shaped sections at the top and bottom of said outer section, and a middle section spaced from each of said boot sections, with an angled channel having an arcuate terminal area separating the middle section from each boot section; and a flexible diaphragm disposed across the interior diameter of the annular member said diaphragm being attached to the section at about the midpoint in its elevation, said diaphragm having an optional central throughbore.

11. In the valve of claim 10 wherein the diaphragm includes a fabric interlayer.

12. In the valve of claim 10 further including a circular convolute within the diaphragm for added flexibility.

13. In the valve of claim 11 further including a circular convolute within the diaphragm for added flexibility.

* * * * *